Figure 1:
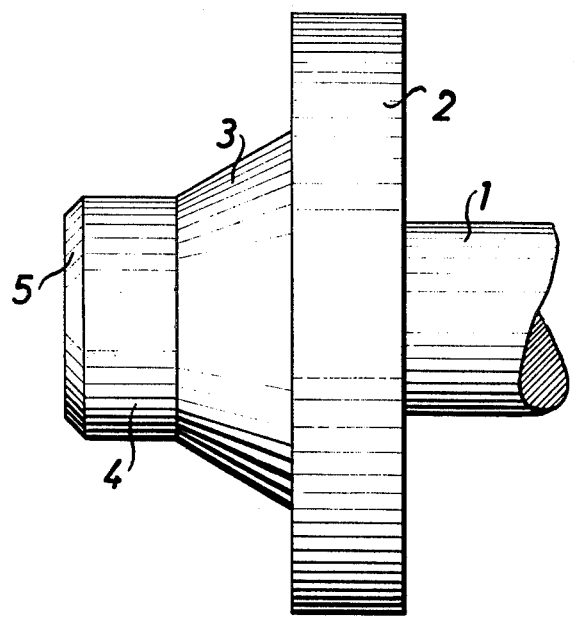

United States Patent [19]

Schneiders et al.

[11] 4,018,863
[45] Apr. 19, 1977

[54] PROCESS FOR FLANGING POLYTETRAFLUOROETHYLENE PIPES

[75] Inventors: Ernst Schneiders, Erftstadt Kierdorf; Wilhelm Klöcker, Bruhl, both of Germany

[73] Assignee: Hoechst Aktiengesellschaft, Frankfurt am Main, Germany

[22] Filed: Sept. 30, 1974

[21] Appl. No.: 510,465

[30] Foreign Application Priority Data

Oct. 4, 1973 Germany .................. 2349818

[52] U.S. Cl. ............... 264/249; 264/269; 264/296; 264/310; 264/320
[51] Int. Cl.² .............. B29C 27/16; B29D 3/00
[58] Field of Search ......... 264/269, 296, 310, 127, 264/320, 331, 339, 322, 249

[56] References Cited
UNITED STATES PATENTS

| | | | |
|---|---|---|---|
| 2,608,501 | 8/1952 | Kimble | 264/269 |
| 3,142,868 | 8/1964 | Blount | 264/269 |
| 3,281,512 | 10/1966 | Reiling | 264/127 |
| 3,293,018 | 12/1966 | Doty | 264/310 |
| 3,435,109 | 3/1969 | Flaming | 264/296 |
| 3,769,393 | 10/1973 | Bjalme | 264/310 |

*Primary Examiner*—Jan H. Silbaugh
*Attorney, Agent, or Firm*—Connolly and Hutz

[57] ABSTRACT

Polytetrafluoroethylene (PTFE) pipes, which may have a supporting metal mandrel placed therein, are flanged. To this end, use is made of a first implement which is a rigid annular plate having a frustoconical element and a bevelled cylindrical plug slightly smaller in diameter than the PTFE-pipe centrally mounted thereon. The first implement is heated once to 180°–210° C and forced into contact with the PTFE-pipe so that the plug opens thereinto. The PTFE-pipe and the first implement projecting thereinto are caused to rotate for 0.5–3 minutes at a speed of 5–10 rpm and under a contact pressure of 5–20 kg/cm² of pipe surface area to be flanged whereby the free end of the PTFE-pipe is flared. The first implement is removed and replaced by a second implement which is a rigid annular plate having a bevelled cylindrical plug substantially equal in diameter with the PTFE-pipe centrally mounted thereon. The second implement is heated once to 180°–210° C and forced into contact with the PTFE-pipe. The PTFE-pipe and the second implement projecting thereinto are caused to rotate for 1–3 minutes at a speed of 5–15 rpm under a contact pressure of 5–20 kg/cm² of pipe surface area to be flanged, and the flanged end of the PTFE-pipe is chilled by means of a coolant.

7 Claims, 2 Drawing Figures

PROCESS FOR FLANGING POLYTETRAFLUOROETHYLENE PIPES

The present invention relates to flanging pipes of polytetrafluoroethylene (briefly termed PTFE hereinafter).

Even though PTFE is listed among the thermoplasts, it does not soften or flow. It is accordingly fabricated by processes which differ significantly from the methods commonly employed in the processing of plastics.

PTFE-mouldings can be produced, for example by cold-moulding pulverulent PTFE in a ratio of 4:1 under a contact pressure of 300 kg/cm$^2$. At temperatures above its gel point (327° C), PTFE is a rather adhesive material so that it is possible for compressed PTFE-powder to be pressure-sintered at temperatures higher than 380° C and made into compact articles. Processing PTFE powders is, however, not free from adverse effects which reside in the evolution of toxic gases at temperatures above 200° C and in the impossibility to produce more complicated shapes at the high compression ratio indicated above. Pipes flanged on their two ends have therefore been made heretofore from thick-walled semi-finished PTFE-pipes which are successively machined. Besides the loss of PTFE which is caused thereby, it is impossible for PFTE-pipes having flanges on their two ends to be placed within a metal pipe so as to be in close contact therewith. This, however, is desirable in view of the poor mechanical properties of PTFE (Cold flow), particularly in those cases in which pipes relatively large in diameter are concerned.

The present invention now provides a satisfactory process for flanging PTFE-pipes, wherein relatively thin-walled PTFE-pipes are the starting material which are worked at temperatures at which PTFE is not likely to liberate toxic gases.

The present process for flanging polytetrafluoroethylene pipes comprises more particularly: clampingly securing the PTFE-pipe, which may have a supporting mandrel placed therein, to a carriage guided in longitudinal slides, and forming parts of a machine tool, such as a lathe, a radial boring or drilling machine or a horizontal boring and milling machine; clampingly securing to the rotatable jaw chuck of the machine tool a first implement being a rigid annular metal plate having a shaft and a frustoconical element terminating in a plug mounted centrally thereon, opposite directional with respect to each other, the shaft being clampingly securable to the rotatable jaw chuck, and the plug having a diameter slightly smaller than that of the PTFE-pipe to be flanged; aligning the PTFE-pipe and the first implement; heating the first implement once to temperatures within the range about 180° and 210° C; rotating the first implement at a speed within the range about 5 and 15 rpm; forcing the free end of the PTFE-pipe into contact with the rotating first implement for a period within the range about 0.5 and 3 minutes under a contact pressure within the range about 5 and 20 kg/cm$^2$ of pipe surface area to be flanged and flaring the end of the PTFE-pipe to the extent necessary for forming a flange thereon; replacing the first implement by a second implement being a rigid annular metal plate having a shaft and a plug mounted centrally thereon, opposite directional with respect to one another, the shaft mounted on the second implement being clampingly securable to the rotatable jaw chuck of the machine tool, and the plug having a diameter corresponding approximately to the internal diameter of the PTFE-pipe to be flanged; heating the second implement once to temperatures within the range about 180° and 210° C; rotating the second implement at a speed within the range about 5 and 15 rpm; forcing the second implement into contact with the flared end of the PTFE-pipe for a period within the range about 1 and 3 minutes under a contact pressure within the range about 5 and 20 kg/cm$^2$ of pipe surface area to be flanged and producing the flange; and chilling the flanged end of the PTFE-pipe by means of a coolant.

A modification of the process for flanging polytetrafluorethylene pipes comprises: clampingly securing the PTFE-pipe, which may have a supporting mandrel placed therein to the rotatable jaw chuck of a machine tool, such as a lathe, a radial boring or drilling machine or a horizontal boring and milling machine; clampingly securing to the carriage guided in longitudinal slides, and forming part, of the machine tool a first implement being a rigid annular metal plate having a shaft and a frustoconical element terminating in a machined plug mounted centrally thereon, opposite directional with respect to each other, the shaft being clampingly securable to the tool holder of the machine tool, and the plug having a diameter slightly smaller than the internal diameter of the PTFE-pipe to be flanged; aligning the PTFE-pipe and the first implement; heating the first implement once to temperatures within the range about 180° and 210° C; rotating the PTFE-pipe at a speed within the range about 5 and 15 rpm; forcing the first implement into contact with the free end of the rotating PTFE-pipe for a period within the range about 0.5 and 3 minutes under a contact pressure within the range about 5 and 20 kg/cm$^2$ of pipe surface area to be flanged and flaring the end of the PTFE-pipe to the extent necessary for forming a flange thereon; replacing the first implement by a second implement being a rigid annular metal plate having a shaft and a plug mounted centrally thereon, opposite directional with respect to one another, the shaft mounted on the second implement being clampingly securable to the tool holder of the machine tool, and the plug having a diameter corresponding approximately to the internal diameter of the PTFE-pipe to be flanged; heating the second implement once to temperatures within the range about 180° and 210° C; rotating the PTFE-pipe at a speed within the range about 5 and 15 rpm; forcing the flared end of the PTFE-pipe into contact with the second implement for a period within the range about 1 and 3 minutes under a contact pressure within the range about 5 and 20 kg/cm$^2$ of pipe surface area to be flanged and producing the flange; and chilling the flanged end of the PTFE-pipe by means of a coolant.

Further preferred features of the present process provide:

a. for the annular plates forming part of the first and second implements, respectively, to have a diameter larger than that of the flange to be produced;

b. for the first implement to be heated once to temperatures within the range 190° and 200° C;

c. for the second implement to be heated once to temperatures within the range 190° and 200° C;

d. for the first implement to be rotated at a speed of about 10 rpm;

e. for the second implement to be rotated at a speed of about 10 rpm;

f. for the PTFE-pipe to be forced into close contact with the first implement under a contact pressure within the range 6 and 10 kg/cm² of pipe surface area to be flanged;

g. for the flared PTFE-pipe to be forced into close contact with the second implement under a pressure within the range 6 and 10 kg/cm² of pipe surface area to be flanged;

h. for the PTFE-pipe to be forced into close contact with the first implement for a period within the range 1 and 2 minutes;

i. for the flared end of the PTFE-pipe to be forced into close contact with the second implement for a period within the range 1.5 and 2 minutes;

j. for water to be used as the coolant; and k. for compressed air to be used as the coolant.

The present process enables PTFE-pipes to be flanged without any significant loss of material, at temperatures at which semifinished PTFE-articles are definitely not likely to liberate toxic gases. In addition to this, it is possible for PTFE-pipes surrounded by a metal pipe to be provided with flanges on their two ends. Prior to flanging the PTFE-pipe, it is, however, necessary for it to be positioned in the metal pipe so that a PTFE-pipe portion extends therefrom, and for the PTFE-pipe to be held in position by means of a supporting mandrel. The PTFE-pipe is then flanged in accordance with this invention with the resultant formation of metal pipes which are lined with PTFE and have flanged ends which can be tightened together by means of screws or bolts. It is possible for the flanges to have a dimension approaching the radius of the PTFE-pipe and a wall-thickness substantially approaching that of the PTFE-pipe.

The invention will now be described with reference to the accompanying drawing which shows exemplary representations of the implements used in carrying out the present proces. FIG. 1 is an exemplary representation of the first implement and FIG. 2 is an exemplary representation of the second implement.

As can be seen, a shaft 1, which is clampingly securable to the jaw chuck or support of a machine tool, has an annular plate 2 secured to it. The plate 2 has the wall thickness necessary to obviate deformation under the contact working pressure.

As shown in FIG. 1, the annular plate 2 forming part of the first implement terminates in a machined frustoconical element 3 and a plug 4 which has a bevelled edge 5.

Figure 2:
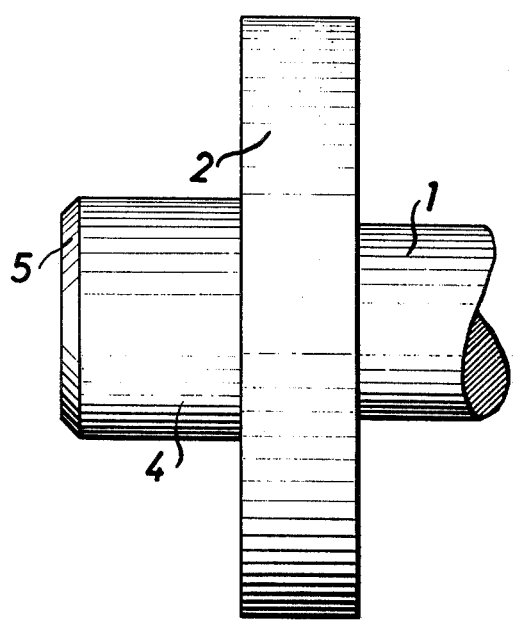

As shown in FIG. 2, the annular plate 2 terminates in a machined plug 4 having a bevelled edge 5.

EXAMPLE 1

A supporting mandrel was positioned in a PTFE-pipe with the following dimensions (length = 500 mm, external diameter = 28 mm, wall thickness = 2 mm). The PTFE-pipe was clampingly secured to the table of a universal radial boring machine. Secured to the jaw chuck of the machine was a first implement having a plug 4 with a diameter of 23.5 mm and a frustoconical element 3 which was 27 mm long and 80 mm in diameter (base area). The annular plate was 10 mm thick. The PTFE-pipe and the implement were aligned and the first implement was heated once to 210° C. At a speed of 11 rpm, the first implement was forced into close contact with the PTFE-pipe for a period of 2 minutes, under a pressure of 9 kg/cm² of surface to be flanged. After that operation, the first implement was replaced by a second implement of which the plug 4 had a diameter of 23.5 mm and of which the annular plate was 10 mm thick. The second implement was heated once to 210° C, caused to rotate at a speed of 11 rpm and forced into close contact with the flared end of the PTFE-pipe, for a period of 1 minute under a pressure of 10 kg/cm² of surface to be flanged. Following this, the flange so made was chilled by spraying water thereonto.

EXAMPLE 2

A PTFE-pipe (external diameter: about 53 mm, wall thickness: 2 mm) was so positioned in a steel pipe (length: 1000 mm; internal diameter: 54 mm) having flanges rigidly secured to its two ends that PTFE-pipe portions 33 mm long extended outwardly from the two ends of the steel pipe. The PTFE-pipe was held in position in the steel pipe by means of supporting mandrels and the steel pipe was clampingly secured to the jaw chuck of a machine tool. Secured to the tool holder of the machine was a first implement having a plug 4 with a diameter of 48.5 mm and a frustoconical element 3 which was 30 mm long and 100 mm in diameter (base area). The annular plate was 10 mm thick. The steel pipe and the implement were aligned and the first implement was heated once to 200° C. At a speed of 8 rpm, the first implement was forced into close contact with the PTFE-pipe portion extending from the steel pipe for a period of 1 minute, under a pressure of 11 kg/cm² of surface to be flanged. After that operation, the first implement was replaced by a second implement of which the plug 4 had a diameter of 48.5 mm and of which the annular plate was 10 mm thick. The second implement was heated once to 190° C, caused to rotate at a speed of 8 rpm and forced into close contact with the flared end of the PTFE-pipe, for a period of 2 minutes under a pressure of 13 kg/cm² of surface to be flanged. Following this, the flange so made was chilled by means of compressed air.

EXAMPLE 3

A steel pipe (length: 500 mm; internal diameter: 29 mm) with flanges welded thereto was clampingly secured to the jaw chuck of a machine tool, and a PTFE-pipe (length: about 560 mm; external diameter: 28 mm; wall thickness: 2 mm) was positioned therein so that PTFE-portions 30 mm long extended from both ends of the steel pipe. The PTFE-pipe was held in position in, in contact with the wall of, the steel pipe by means of a supporting mandrel. Secured to the steel holder of the support of the machine tool was a first implement having a plug 4 with a diameter of 23.5 mm and a length of 15 mm, and a frustoconical element 3 which was 27 mm long and 23.5 mm and 80 mm, repectively in diameter (base area). The PTFE-pipe and the implement were aligned and the first implement was heated once to 200° C. At a speed of 11 rpm, the first implement was forced into close contact with the PTFE-pipe for a period of 1 minute, under a pressure of 7 kg/cm² of surface to be flanged. After that operation, the first implement was replaced by a second implement of which the plug 4 had a diameter of 23.5 mm and a length of 15 mm. The annular plate 2 was 80 mm in diameter and 10 mm thick. The second implement was heated once to 200° C, caused to rotate at a speed of 11 rpm and forced into close contact with the flared end of the PTFE-pipe, for a period of 1 minute under a pressure of 9 kg/cm² of surface to be flanged. Following this, the flange so made was chilled by spraying water thereonto.

EXAMPLE 4

A supporting mandrel was positioned in a PTFE-pipe with the following dimensions (length = 1000 mm, external diameter = 53 mm, wall thickness = 2 mm). The PTFE-pipe was clampingly secured to the table of a horizontal boring and milling machine. Secured to the boring spindle of the machine was a first implement having a plug 4 with a diameter of 48.5 and a length of 15 mm, and a frustoconical element 3 which was 30 mm long and 48.5 mm amd 100 mm, respectively in diameter, (base area). The annular plate 2 was 15 mm thick. The PTFE-pipe and the implement were aligned and the first implement was heated once to 200° C. At a speed of 8 rpm, the first implement was forced into close contact with the PTFE-pipe for a period of 2 minutes, under a pressure of 9 kg/cm² of surface to be flanged. After that operation, the first implement was replaced by a second implement of which the plug 4 was 15 mm long and 48.5 mm in diameter. The annular plate 2 was 100 mm in diameter. The second implement was heated to 200° C, caused to rotate at a speed of 8 rpm and forced into close contact with the flared end of the PTFE-pipe, for a period of 1 minute under a pressure of 10 kg/cm² of surface to be flanged. Following this, the flange so made was chilled by means of compressed air.

We claim:

1. In a process for flanging a pipe consisting of a thermoformable plastic material, wherein said pipe is placed in a metal conduit having a diameter slightly larger than the diameter of said pipe and terminating at one end thereof in a solid flange which is rigidly secured thereto, and wherein said pipe is so placed in said conduit that one end extends outwardly from the solid flange, and wherein an expandable supporting mandrel is positioned within said pipe which is expandable from the outside so as to bring said pipe into close contact with said conduit around it, and wherein the one end of said pipe extending outwardly from the solid flange of said conduit is at first cone-shaped flared and thereafter formed to a flange and the resulting flange is chilled by spraying a coolant thereonto, the improvement according to which the thermoformable plastic material consists of polytetrafluoroethylene (PTFE); a first metal implement is heated to temperatures within the range of about 180° to 210° C prior to flaring the end of said pipe; the end of said pipe and the first implement being forced against each other for flaring the end of said pipe under an area pressure within the range 5 to 20 kg/cm² and under a uniform sliding movement of the end of said pipe and the first implement, relatively to each other, within the range 5 to 15 rpm; and the end of said pipe being flared in a first step within the range of about 0.5 to 3 minutes; a second metal implement is heated to temperatures within the range of about 180° to 210° C prior to forming of a flange on the flared end of said pipe; the flared end of said pipe and the second implement being forced against each other for forming the end of said pipe to a flange under an area pressure within the range 5 to 20 kg/cm² and under a uniform sliding movement of the end of said pipe and the second implement, relative to each other, within the range 5 to 15 rpm; and the flared end of said pipe being formed to a flange in a second step within the range of about 1 to 3 minutes whereby a PTFE pipe is flanged while maintaining the pipe below a temperature at which toxic gases are released.

2. The process as claimed in claim 1, wherein each implement is heated to temperatures within the range of about 190° to 200° C prior to flaring and forming to a flange the end of said pipe.

3. The process as claimed in claim 1, wherein the sliding movement of the end of said pipe and each implement, relatively to each other, is obtained at about 10 rpm of rotation relative to each other.

4. The process as claimed in claim 1, wherein the end of said pipe is forced to each implement under an area pressure within the range 6 to 10 kg/cm².

5. The process as claimed in claim 1, wherein the end of said pipe is flared in said first step within the range of about 1 to 2 minutes.

6. The process as claimed in claim 1, wherein the flared end of said pipe is formed to a flange in said second step within the range of about 1.5 to 2 minutes.

7. The process as claimed in claim 1, wherein said metal conduit has a pair of solid flanges arranged at both of its ends, said pipe has two ends extending outwardly therefrom, and both of the ends of said pipe being flanged by the process as claimed in claim 27.

* * * * *

UNITED STATES PATENT AND TRADEMARK OFFICE
CERTIFICATE OF CORRECTION

PATENT NO. : 4,018,863
DATED : April 19, 1977
INVENTOR(S) : Schneiders et al

It is certified that error appears in the above–identified patent and that said Letters Patent are hereby corrected as shown below:

Column 5, line 13, change "amd" to -- and --.

Column 6, line 22, change "PTFE pipe" to -- PTFE-pipe --.

Column 6, line 46, change "claim 27" to -- claim 1 --.

Signed and Sealed this

Fifteenth Day of November 1977

[SEAL]

Attest:

RUTH C. MASON
Attesting Officer

LUTRELLE F. PARKER
Acting Commissioner of Patents and Trademarks